US008028093B2

(12) United States Patent
Karaoguz et al.

(10) Patent No.: US 8,028,093 B2
(45) Date of Patent: Sep. 27, 2011

(54) MEDIA PROCESSING SYSTEM SUPPORTING ADAPTIVE DIGITAL MEDIA PARAMETERS BASED ON END-USER VIEWING CAPABILITIES

(75) Inventors: Jeyhan Karaoguz, Irvine, CA (US); James D. Bennett, Laguna Beach, CA (US)

(73) Assignee: Broadcom Corporation, Irvine, CA (US)

( * ) Notice: Subject to any disclaimer, the term of this patent is extended or adjusted under 35 U.S.C. 154(b) by 1440 days.

(21) Appl. No.: 10/675,377

(22) Filed: Sep. 30, 2003

(65) Prior Publication Data

US 2004/0133701 A1    Jul. 8, 2004

Related U.S. Application Data

(60) Provisional application No. 60/467,990, filed on May 5, 2003, provisional application No. 60/443,897, filed on Jan. 30, 2003, provisional application No. 60/444,099, filed on Jan. 30, 2003, provisional application No. 60/443,996, filed on Jan. 30, 2003, provisional application No. 60/444,243, filed on Jan. 30, 2003, provisional application No. 60/464,711, filed on Apr. 23, 2003, provisional application No. 60/457,179, filed on Mar. 25, 2003, provisional application No. 60/467,867, filed on May 5, 2003, provisional application No. 60/432,472, filed on Dec. 11, 2002, provisional application No. 60/443,894, filed on Jan. 30, 2003.

(51) Int. Cl.
*G06F 15/16* (2006.01)
*H04N 7/16* (2006.01)

(52) U.S. Cl. ....................................... 709/246; 725/140

(58) Field of Classification Search .................. 709/217, 709/227, 228, 229, 230–234, 246; 370/229–238, 370/395.2, 395.21; 725/105–142; 348/113–115
See application file for complete search history.

(56) References Cited

U.S. PATENT DOCUMENTS

| | | |
|---|---|---|
| 5,404,488 A | 4/1995 | Kerrigan et al. |
| 5,428,606 A | 6/1995 | Moskowitz |
| 5,526,358 A | 6/1996 | Gregerson et al. |
| 5,583,763 A | 12/1996 | Atcheson et al. |
| 5,644,714 A | 7/1997 | Kikinis |

(Continued)

FOREIGN PATENT DOCUMENTS

EP    0961490 A2    12/1999

(Continued)

OTHER PUBLICATIONS 15-1243.A5.fm. Published Sep. 12, 2000 by RadioShack.*

(Continued)

*Primary Examiner* — William C Vaughn, Jr.
*Assistant Examiner* — Scott Christensen
(74) *Attorney, Agent, or Firm* — McAndrews, Held & Malloy, Ltd.

(57) ABSTRACT

Systems and methods that adapt media content are described. In one embodiment, a system may include, for example, a first communications device and a second communications device. The first communications device may be disposed in a first location and may be operatively coupled to a network. The second communications device may be disposed in a second location and may be operatively coupled to the network. The second communications device may receive a device profile relating to the first communications device, adapt media content based upon the device profile of the first communications device, and send the adapted media content to the first communications device.

29 Claims, 12 Drawing Sheets

U.S. PATENT DOCUMENTS

| | | | |
|---|---|---|---|
| 5,721,815 A | 2/1998 | Ottesen et al. | |
| 5,721,825 A | 2/1998 | Lawson et al. | |
| 5,721,878 A | 2/1998 | Ottesen et al. | |
| 5,841,990 A | 11/1998 | Picazo et al. | |
| 5,862,325 A | 1/1999 | Reed et al. | |
| 5,896,382 A | 4/1999 | Davis et al. | |
| 5,913,032 A | 6/1999 | Schwartz et al. | |
| 5,917,997 A | 6/1999 | Bell et al. | |
| 5,926,478 A | 7/1999 | Ghaibeh et al. | |
| 5,930,493 A | 7/1999 | Ottesen et al. | |
| 5,974,453 A | 10/1999 | Andersen et al. | |
| 6,047,327 A | 4/2000 | Tso et al. | |
| 6,055,570 A | 4/2000 | Nielsen | |
| 6,141,688 A | 10/2000 | Bi et al. | |
| 6,219,839 B1 | 4/2001 | Sampsell | |
| 6,233,428 B1 | 5/2001 | Fryer | |
| 6,249,523 B1 | 6/2001 | Hrastar et al. | |
| 6,272,129 B1 | 8/2001 | Dynarski et al. | |
| 6,349,324 B1 | 2/2002 | Tokoro | |
| 6,353,929 B1 * | 3/2002 | Houston | 725/20 |
| 6,388,714 B1 | 5/2002 | Schein et al. | |
| 6,480,889 B1 | 11/2002 | Saito et al. | |
| 6,490,725 B2 | 12/2002 | Kikinis | |
| 6,563,816 B1 | 5/2003 | Nodoushani et al. | |
| 6,591,306 B1 | 7/2003 | Redlich | |
| 6,631,247 B1 | 10/2003 | Motoyama et al. | |
| 6,636,499 B1 | 10/2003 | Dowling | |
| 6,640,097 B2 | 10/2003 | Corrigan et al. | |
| 6,643,658 B1 | 11/2003 | Jai et al. | |
| 6,654,796 B1 | 11/2003 | Slater et al. | |
| 6,665,020 B1 | 12/2003 | Stahl et al. | |
| 6,686,838 B1 | 2/2004 | Rezvani et al. | |
| 6,693,896 B1 | 2/2004 | Utsumi et al. | |
| 6,728,239 B1 | 4/2004 | Kung et al. | |
| 6,735,619 B1 | 5/2004 | Sawada | |
| 6,751,657 B1 | 6/2004 | Zothner | |
| 6,754,904 B1 | 6/2004 | Cooper et al. | |
| 6,760,762 B2 | 7/2004 | Pezzutti | |
| 6,763,454 B2 | 7/2004 | Wilson et al. | |
| 6,774,926 B1 | 8/2004 | Ellis et al. | |
| 6,775,658 B1 | 8/2004 | Zothner | |
| 6,823,454 B1 | 11/2004 | Hind et al. | |
| 6,842,774 B1 | 1/2005 | Piccioni | |
| 6,857,009 B1 | 2/2005 | Ferreria et al. | |
| 6,901,439 B1 | 5/2005 | Bonasia et al. | |
| 6,907,465 B1 | 6/2005 | Tsai | |
| 6,915,528 B1 | 7/2005 | McKenna, Jr. | |
| 6,934,754 B2 | 8/2005 | West et al. | |
| 6,941,356 B2 | 9/2005 | Meyerson | |
| 6,950,875 B1 | 9/2005 | Slaughter et al. | |
| 6,963,358 B2 | 11/2005 | Cohen et al. | |
| 6,965,581 B2 | 11/2005 | Nguyen et al. | |
| 6,982,953 B1 | 1/2006 | Swales | |
| 6,996,628 B2 | 2/2006 | Keane et al. | |
| 7,003,795 B2 | 2/2006 | Allen | |
| 7,010,303 B2 | 3/2006 | Lewis et al. | |
| 7,020,694 B2 | 3/2006 | Saito et al. | |
| 7,035,271 B1 | 4/2006 | Peterson | |
| 7,039,391 B2 | 5/2006 | Rezvani et al. | |
| 7,055,104 B1 | 5/2006 | Billmaier et al. | |
| 7,065,778 B1 | 6/2006 | Lu | |
| 7,069,312 B2 | 6/2006 | Kostic et al. | |
| 7,075,573 B2 | 7/2006 | Imaeda | |
| 7,079,527 B2 | 7/2006 | Owens | |
| 7,080,400 B1 | 7/2006 | Navar | |
| 7,114,070 B1 | 9/2006 | Willming et al. | |
| 7,130,895 B2 | 10/2006 | Zintel et al. | |
| 7,165,109 B2 | 1/2007 | Chiloyan et al. | |
| 7,181,488 B2 | 2/2007 | Martin et al. | |
| 7,197,550 B2 | 3/2007 | Cheline et al. | |
| 7,213,061 B1 | 5/2007 | Hite et al | |
| 7,234,117 B2 | 6/2007 | Zaner et al. | |
| 7,243,132 B2 | 7/2007 | Choi | |
| 7,243,141 B2 | 7/2007 | Harris | |
| 7,272,137 B2 | 9/2007 | Unitt et al. | |
| 7,280,546 B1 | 10/2007 | Sharma et al. | |
| 7,281,220 B1 | 10/2007 | Rashkovskiy | |
| 7,296,283 B2 | 11/2007 | Hrastar et al. | |
| 7,299,304 B2 | 11/2007 | Saint-Hilaire et al. | |
| 7,299,488 B2 | 11/2007 | Brodigan et al. | |
| 7,302,487 B2 | 11/2007 | Ylonen et al. | |
| 7,308,575 B2 | 12/2007 | Basil et al. | |
| 7,313,384 B1 | 12/2007 | Meenan et al. | |
| 7,313,606 B2 | 12/2007 | Donahue et al. | |
| 7,316,022 B2 | 1/2008 | Nishio | |
| 7,328,266 B2 | 2/2008 | Schmidt et al. | |
| 7,349,967 B2 | 3/2008 | Wang | |
| 7,370,091 B1 | 5/2008 | Slaughter et al. | |
| 7,496,647 B2 | 2/2009 | Karaoguz et al. | |
| 7,496,665 B2 | 2/2009 | Karaoguz et al. | |
| 7,734,788 B2 | 6/2010 | Karaoguz et al. | |
| 2001/0004768 A1 | 6/2001 | Hodge et al. | |
| 2001/0030785 A1 | 10/2001 | Pangrac et al. | |
| 2002/0016971 A1 | 2/2002 | Berezowski et al. | |
| 2002/0042778 A1 | 4/2002 | Nel | |
| 2002/0042924 A1 | 4/2002 | Adams | |
| 2002/0053081 A1 | 5/2002 | Griggs | |
| 2002/0054087 A1 | 5/2002 | Noll et al. | |
| 2002/0056119 A1 | 5/2002 | Moynihan | |
| 2002/0059163 A1 | 5/2002 | Smith | |
| 2002/0078161 A1 | 6/2002 | Cheng | |
| 2002/0087549 A1 | 7/2002 | Mostafa | |
| 2002/0104093 A1 | 8/2002 | Buehl et al. | |
| 2002/0104098 A1 | 8/2002 | Zustak et al. | |
| 2002/0104099 A1 | 8/2002 | Novak | |
| 2002/0116464 A1 | 8/2002 | Mak | |
| 2002/0124258 A1 | 9/2002 | Fritsch | |
| 2002/0152311 A1 | 10/2002 | Veltman et al. | |
| 2002/0190876 A1 | 12/2002 | Lai et al. | |
| 2002/0194309 A1 | 12/2002 | Carter et al. | |
| 2003/0004916 A1 | 1/2003 | Lewis | |
| 2003/0028893 A1 | 2/2003 | H. Addington | |
| 2003/0043272 A1 | 3/2003 | Nagao et al. | |
| 2003/0056008 A1 | 3/2003 | Russell et al. | |
| 2003/0061315 A1 | 3/2003 | Jin | |
| 2003/0078968 A1 | 4/2003 | Needham et al. | |
| 2003/0079124 A1 | 4/2003 | Serebrennikov | |
| 2003/0081619 A1 | 5/2003 | Phillips et al. | |
| 2003/0084173 A1 | 5/2003 | Deleu et al. | |
| 2003/0112467 A1 | 6/2003 | McCollum et al. | |
| 2003/0115585 A1 | 6/2003 | Barsness | |
| 2003/0135553 A1 | 7/2003 | Pendakur | |
| 2003/0151621 A1 | 8/2003 | McEvilly et al. | |
| 2003/0154285 A1 | 8/2003 | Berglund et al. | |
| 2003/0225864 A1 | 12/2003 | Gardiner et al. | |
| 2003/0237097 A1 | 12/2003 | Marshall et al. | |
| 2004/0003040 A1 | 1/2004 | Beavers | |
| 2004/0003051 A1 | 1/2004 | Krzyzanowski et al. | |
| 2004/0024886 A1 | 2/2004 | Saxena | |
| 2004/0045030 A1 * | 3/2004 | Reynolds et al. | 725/110 |
| 2004/0045035 A1 | 3/2004 | Cummings et al. | |
| 2004/0111476 A1 | 6/2004 | Trossen et al. | |
| 2004/0117306 A1 | 6/2004 | Karaoguz et al. | |
| 2004/0117429 A1 | 6/2004 | Karaoguz et al. | |
| 2004/0117824 A1 | 6/2004 | Karaoguz et al. | |
| 2004/0117834 A1 | 6/2004 | Karaoguz et al. | |
| 2004/0117845 A1 | 6/2004 | Karaoguz et al. | |
| 2004/0117846 A1 | 6/2004 | Karaoguz et al. | |
| 2004/0133694 A1 | 7/2004 | Karaoguz et al. | |
| 2004/0139173 A1 | 7/2004 | Karaoguz et al. | |
| 2004/0163127 A1 | 8/2004 | Karaoguz et al. | |
| 2004/0243671 A9 | 12/2004 | Needham et al. | |
| 2005/0028208 A1 | 2/2005 | Ellis et al. | |
| 2007/0174886 A1 | 7/2007 | Scheuer et al. | |
| 2007/0198738 A1 | 8/2007 | Angiolillo et al. | |
| 2007/0220580 A1 | 9/2007 | Putterman et al. | |
| 2009/0157808 A1 | 6/2009 | Karaoguz et al. | |
| 2009/0282098 A1 | 11/2009 | Karaoguz et al. | |
| 2010/0245606 A1 | 9/2010 | Karaoguz et al. | |

FOREIGN PATENT DOCUMENTS

| | | |
|---|---|---|
| EP | 1076459 A2 | 2/2001 |
| WO | WO 01/19084 A1 | 3/2001 |
| WO | WO 01/31472 | 5/2001 |
| WO | WO 01/46818 | 6/2001 |
| WO | WO 01/71983 | 9/2001 |

| WO | WO 02/30116 | 4/2002 |
| WO | WO 02/37943 | 5/2002 |
| WO | WO 02/80552 | 10/2002 |

OTHER PUBLICATIONS

Smith, J R et al, "Transcoding Internet Content for Heterogenous Client Devices", Circuits and Systems, 1998 ISCAS '98 Proceedings of the 1998 IEEE International Symposium on Monterey, CA, USA, May 31 to Jun. 3, 1998, New York, NY, USA IEEE, US, May 31, 1998, pp. 599-602 XP010289378 ISBN: 0-7803-4455-3.

"The Gnutell Protocol Specification vO.4", posted on www.clip2.com/GnutellProtocol04.pdf on Jun. 3, 2001.

Communication pursuant to Article 94(3) EPC for European Patent Application No. 04001 227.0-2413, dated Dec. 11, 2009.

European Search Report corresponding to European Application No. 04001225.4, Feb. 7, 2004.

European Search Report corresponding to European Application No. 04001227.0, Nov. 22, 2005.

European Search Report for Application No. 04001226.2, mailed Sep. 3, 2007.

Fischetti, Mark. "The Future of TV". Technology Review. Nov. 2001, pp. 35-40.

Halonen, Doug. "FCC May Order 'A La Carte' Cable Service", Eletronic Media, Jan. 26, 1998, vol. 17, Issue 5. p. 3 (2 pgs).

Metabyte Announces Personalized IV Software, INTERNAT, Jan. 21, 1999, XPOO2154116.

Moh M et al, "Mobile IP Telephony: Mobility Support of SIP", Computer Communications and Networks, 1999, Proceedings, Eigth International Conference in Boston, MA, USA, Oct. 11-13, 1999, Piscataway, NJ, USA, IEEE, Oct. 11, 1999, pp. 554-559, XP010359588 ISBN: 0-7803-5794-9.

ReplayTV4000userguide, 2001, SONICblue Inc.

Schulzrine H et al, "Application-Layer Mobility Using SIP", Service Portability and Virtual Customer Environments, 2000 IEEE San Francisco, CA, USA, Dec. 1, 2000, Piscataway, NJ, USA, IEEE, pp. 29-36, XP010551460 ISBN: 0-7803-7133-X.

Share it! Deliverable #3, Nov. 30, 2002, pp. 1-93.

Tokmakoff A et al, Home Media Server Content Management, Proceedings of the Spie, Spie, Bellingham, VA, US, vol. 4519, Aug. 22, 2001, XP009017768 ISSN:0277786X.

* cited by examiner

| CHANNEL LINE UP | <<1PM | 2PM | HOUR, DAY ... | 6PM | 7PM>> |
|---|---|---|---|---|---|
| FAMILY VACATIONS | | | | | |
| KID's SPORTS | | | | | |
| ... | | | | | |
| VACATION in ALASKA VIDEO  *802* | Normal Estimated Delivery Time: 2 hrs 13 min Cost: 59c (without Queuing) | | Showing All Day (48 Min), Earliest Order Time: 4:00PM MPEG-2 1.5 Mbps | | |
| VACATION in ALASKA VIDEO  *803* | Express Estimated Delivery Time: 18 min Cost: $1.2 (with Queuing) | | Showing All Day (48 Min), Earliest Order Time: 4:00PM MPEG-2 4 Mbps | | |
| VACATION in ALASKA VIDEO  *804* | Overnight Delivery: Avail Nxt Morning Cost: 5c (Server Stored) | | Showing All Day (48 Min), Earliest Order Time: 4:00PM MPEG-2 19 Mbps | | |

*800* → (table)

*801* braces the three VACATION in ALASKA VIDEO rows

Fig. 8

MEDIA PROCESSING SYSTEM SUPPORTING ADAPTIVE DIGITAL MEDIA PARAMETERS BASED ON END-USER VIEWING CAPABILITIES

CROSS-REFERENCE TO RELATED APPLICATIONS/INCORPORATION BY REFERENCE

This application makes reference to, claims priority to and claims benefit from U.S. Patent Application Ser. No. 60/467,990, entitled "Media Processing System Supporting Adaptive Digital Media Parameters Based On End-User Viewing Capabilities" and filed on May 5, 2003; U.S. Patent Application Ser. No. 60/443,897, entitled "Media Processing System Providing Access to Distributed Media via a Channel Guide" and filed on Jan. 30, 2003; U.S. Patent Application Ser. No. 60/444,099, entitled "Media Channel Setup in a Media Exchange Network" and filed on Jan. 30, 2003; U.S. Patent Application Ser. No. 60/443,996, entitled "Media Processing System Automatically Offering Access to Newly Available Media in a Media Exchange Network" and filed on Jan. 30, 2003; U.S. Patent Application Ser. No. 60/444,243, entitled "Migration of Stored Media Through a Media Exchange Network" and filed on Jan. 30, 2003; U.S. Patent Application Ser. No. 60/464,711, entitled "Automated Routing and Consumption of Media Through a Media Exchange Network" and filed on Apr. 23, 2003; U.S. Patent Application Ser. No. 60/457,179, entitled "Server Architecture Supporting a Personal Media Exchange Network" and filed on Mar. 25, 2003; U.S. Patent Application Ser. No. 60/467,867, entitled "Billing Support in a Media Exchange Network" and filed on May 5, 2003; U.S. Patent Application Ser. No. 60/432,472, entitled "Personal Inter-Home Media Exchange Network" and filed on Dec. 11, 2002; and U.S. Patent Application Ser. No. 60/443,894, entitled "Access and Control of Media Peripherals Via a Media Processing System" and filed on Jan. 30, 2003. The complete subject matter of the above-identified applications are hereby incorporated herein by reference in their entirety.

In addition, this application makes reference to U.S. patent application Ser. No. 10/657,390, filed on Sep. 8, 2003, now issued U.S. Pat. No. 7,496,647; and U.S. patent application Ser. No. 10/660,267, filed Sep. 11, 2003, now U.S. Pat. No. 7,496,665. The complete subject matter of the above-identified applications are hereby incorporated herein by reference in their entirety.

FEDERALLY SPONSORED RESEARCH OR DEVELOPMECNT

[Not Applicable]

SEQUENCE LISTING

[Not Applicable]

MICROFICHE/COPYRIGHT REFERENCE

[Not Applicable]

BACKGROUND OF THE INVENTION

Today, files having different display sizes and levels of resolution for images and video may be attached to e-mail messages using a personal computer (PC) and sent to other PC's via the Internet. Also, files may be sent from one location to another over a network such as a local area network (LAN) or a wide area network (WAN)) using a file transfer protocol (FTP). The files may be used in conjunction with certain media players such as PC's, DVD players, PDA's, etc.

Depending on the size of a video file or an image file, the content may be displayed in a different resolution, color content or display size. Files are often sent from a source location to a destination location without the source having any knowledge of the device capabilities at the destination location.

For example, a source PC may send a JPEG image file to a destination PC without knowing the display capabilities of the destination PC. The source PC may send the highest quality JPEG file which can be a very large file. If the destination PC has a lower quality display capability, then the destination PC cannot take advantage of the high quality level of the JPEG file. The large JPEG file may take a long time to transfer from the source PC to the destination PC without the destination PC gaining any advantage (i.e., the destination PC cannot display the high quality of the JPEG file). Also, a very large bandwidth may be required to transfer the JPEG file in a reasonable amount of time.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in, for example, systems and methods that adapt media content. In one embodiment, a system may include, for example, a first communications device and a second communications device. The first communications device may be disposed in a first location and may be operatively coupled to a network. The second communications device may be disposed in a second location and may be operatively coupled to the network. The second communications device may receive a device profile relating to the first communications device, adapt media content based upon the device profile of the first communications device, and send the adapted media content to the first communications device.

In another embodiment, a system may include, for example, a communications device that may be operatively coupled to a network. The communications device may store a revisable device profile of the communications device, send the revisable device profile to the network, and receive media content that has been adapted based upon the sent device profile.

In another embodiment, a system may include, for example, a communications device that may be operatively coupled to a network. The communications device may receive a revisable device profile from the network, adapt media content based upon the received device profile, and send the adapted media content to the network.

In another embodiment, a method may include, for example, one or more of the following: receiving, by a first communications device, a device profile relating to a second communications device, the first communications device and the second communications device being operatively coupled to a network; adapting, by the first communications device, media content based upon the device profile; and sending the adapted media content to the first communications device.

In another embodiment, a method may include, for example, one or more of the following: storing, in a communications device, a revisable device profile of the communications device, the communications device being operatively coupled to a network; sending the revisable device profile to the network; and receiving media content from the network that has been adapted based upon the sent device profile.

These and other advantages, aspects and novel features of the present invention, as well as details of illustrated embodiments thereof, will be more fully understood from the following description and drawings.

BRIEF DESCRIPTION OF THE DRAWINGS

FIG. 8 illustrates an embodiment of a TV guide channel user interface showing several options of a pushed media according to the present invention.

DETAILED DESCRIPTION OF THE INVENTION

Figure 1:
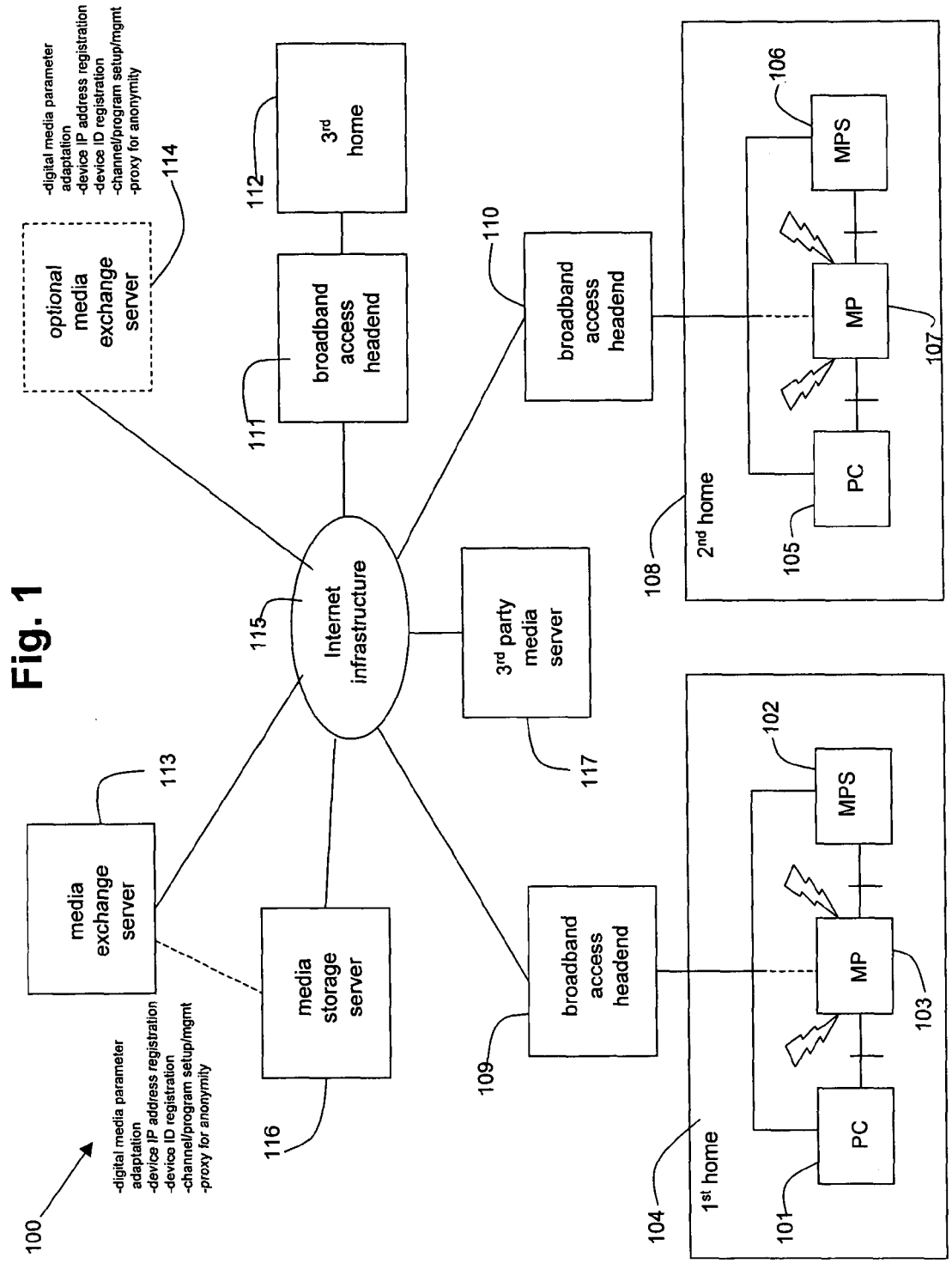
FIG. 1 is a diagram illustrating an embodiment of a media exchange network comprising an architecture to support adaptive digital media parameters according to the present invention.

FIG. 1 is a diagram illustrating an embodiment of a media exchange network comprising an architecture to support adaptive digital media parameters according to present invention. In accordance with an embodiment of the present invention, digital media parameters may include, for example, resolution content, display size, and color/grey-scale content. The media exchange network 100 may include a communication network comprising, for example, a personal computer (PC) 101, a media processing system (MPS) 102, and at least one media peripheral (MP) 103 at a $1^{st}$ home 104; a PC 105, an MPS 106, and at least one MP 107 at a $2^{nd}$ home 108. The MP 103 may interface to the PC 101 and/or the MPS 102 via, for example, a wireless link or a wired link (e.g., a USB connection). The PC 101 and the MPS 102 may interface to a broadband access headend 109. The broadband access headend 109 may comprise, for example, a cable headend, a satellite headend, or a DSL headend in accordance with various embodiments of the present invention. As an option, the MP 103 may interface with the broadband access headend 109. The PC 101, the MPS 102, and/or the MP 103 may include, for example, internal modems (e.g., a cable modem or DSL modem) or other interface devices to communicate with the broadband access headend 109. Optionally, the interface device (e.g., modem) may be external to the PC 101, the MPS 102, and the MP 103.

Similarly, the MP 107 may interface to the PC 105 and/or the MPS 106 via, for example, a wireless link or a wired link (e.g., a USB connection). The PC 105 and the MPS 106 may interface to a broadband access headend 110. The broadband access headend 110 may comprise, for example, a cable headend, a satellite headend, or a DSL headend in accordance with various embodiments of the present invention. As an option, the MP 107 may interface with the broadband access headend 110. The PC 105, the MPS 106, and/or the MP 107 may include, for example, internal modems (e.g., a cable modem or a DSL modem) or other interface device to communicate with the broadband access headend 110. Optionally, the interface device (e.g., modem) may be external to the PC 105, the MPS 106, and the MP 107.

The media exchange network 100 may further comprise, for example, a broadband access headend 111 connected between a $3^{rd}$ home 112 and an Internet infrastructure 115, a media exchange server 113 (e.g., as in the case of a single central server supporting the media exchange network 100) and, optionally, at least one other media exchange server 114 (e.g., as in the case of a multiple server architecture) supporting the media exchange network 100 connected to the Internet infrastructure 115. In accordance with an embodiment of the present invention, the media exchange network 100 may comprise two or more media exchange servers strategically located at various points in the media exchange network 100.

The broadband access headends 109 and 110 may interface to the Internet infrastructure 115. The broadband access headend 111 may comprise, for example, a cable headend, a satellite headend, or a DSL headend in accordance with various embodiments of the present invention. The $3^{rd}$ home 112 may also include, for example, a PC, an MPS, and/or an MP as part of the media exchange network 100.

The media exchange network 100 also may comprise, for example, a media storage server 116 and a $3^{rd}$ party media server 117, both interfacing to the Internet infrastructure 115. The media storage server 116 may interact with the media exchange server 113 and may provide temporary and/or archival storage for digital media on the media exchange network 100. For example, the media storage server 116 may temporarily hold media files that are addressed to certain MPS's and/or PC's on the media exchange network 100.

The $3^{rd}$ party media server 117 may store, for example, movies, video, user profiles, and other digital media that may be provided to users of the media exchange network 100.

In accordance with various embodiments of the present invention, an MPS may comprise, for example, at least one of a set-top box, a PC and a TV with a media management system (MMS). An MMS is also known herein as a media exchange software (MES) platform.

In accordance with various embodiments of the present invention, an MMS may comprise a software platform operating on at least one processor to provide certain functionality including, for example, user interface functionality, distributed storage functionality and networking functionality. For example, an MMS may provide control of media peripheral devices, status monitoring of media peripheral devices and inter-home MPS routing selection in accordance with an embodiment of the present invention.

In accordance with an embodiment of the present invention, a broadband access headend may be upgraded to a media exchange headend by adding functionality to facilitate the exchange of media on the media exchange network in conjunction with the media exchange server. Such functionality may include, for example, distributed networking capability, digital media parameter adaptation, archival functionality (e.g., long term media storage), temporary storage (e.g., to aid in the distribution and routing of media), storage management, and digital rights management.

The media exchange network 100 may support, for example, the adaptation of certain digital parameters of media content based on device capabilities of an end-user on the media exchange network 100. In accordance with an embodiment of the present invention, the media exchange servers 113 and 114 may provide at least some of the functionality on the media exchange network 100 including, for example, digital media parameter adaptation, billing and payment, device registration, channel/program setup and management, and security.

The various elements of the media exchange network 100 may include, for example, storage locations for digital media and data. The storage locations may comprise, for example, hard disk drives, a DVD player, a CD player, floppy disk drives, a RAM, or any combination of these. The storage locations may also include, for example, memory sticks, PCMCIA cards, compact flash cards, or any combination of these.

The PC's 101 and 105 may comprise, for example, desktop PC's, notebook PC's, PDA's, or any computing device.

In accordance with some embodiments of the present invention, the MPS's 102 and 106 may comprise enhanced set-top boxes. The MPS 102 and/or the MPS 106 may include, for example, a TV screen for viewing and interacting with various user interfaces, media, data, and services that are available on the media exchange network using, for example, a remote control. The PC 101 and/or the PC 105 may include, for example, a PC monitor for viewing and interacting with various user interfaces, media, data, and services that are available on the media exchange network using, for example, a keyboard and a mouse. The MPS's, the PC's and/or the MP's may include, for example, functional software to support interaction with the various elements of the media exchange network 100 in accordance with various embodiments of the present invention.

The media peripherals 103 and 107 of the media exchange network 100 may include, for example, a digital camera, a digital camcorder, an MP3 player, a home juke-box system, a personal digital assistant (PDA), a multi-media gateway device, and various home appliances.

Other embodiments of the present invention may comprise various combinations and/or multiple instantiations of the elements of FIG. 1 according to the present invention.

End-user devices (e.g., a PDA, an MPS with a TV display, a PC with a monitor, etc.) may have different capabilities based on certain digital media parameters such as, for example, display resolution, display size, and display color that affect image quality. Media content transferred across a media exchange network may include, for example, images and video having different digital media parameters that support different levels of image and display quality. In a media exchange network, media content may be transferred from one user to another in a channelized manner. The media content may be incorporated into a channel format and the contents of the channel may be pushed from one user to another via the media exchange network.

In accordance with an embodiment of the present invention, a source device (e.g., a PC or an MPS) on a media exchange network may have knowledge of the device capabilities of an end-user or a destination device (e.g., a PC or an MPS) and may ensure that the digital parameters of media content sent from the source device to the end-user are consistent with the device capabilities of the end-user. For example, an MPS of a first end-user on a media exchange network may include a high definition television (HDTV) display capability. An MPS of a second end-user on the media exchange network may include a standard TV display capability. A PC of a third end-user on the media exchange network may include an SVGA PC monitor display capability.

Figure 2:
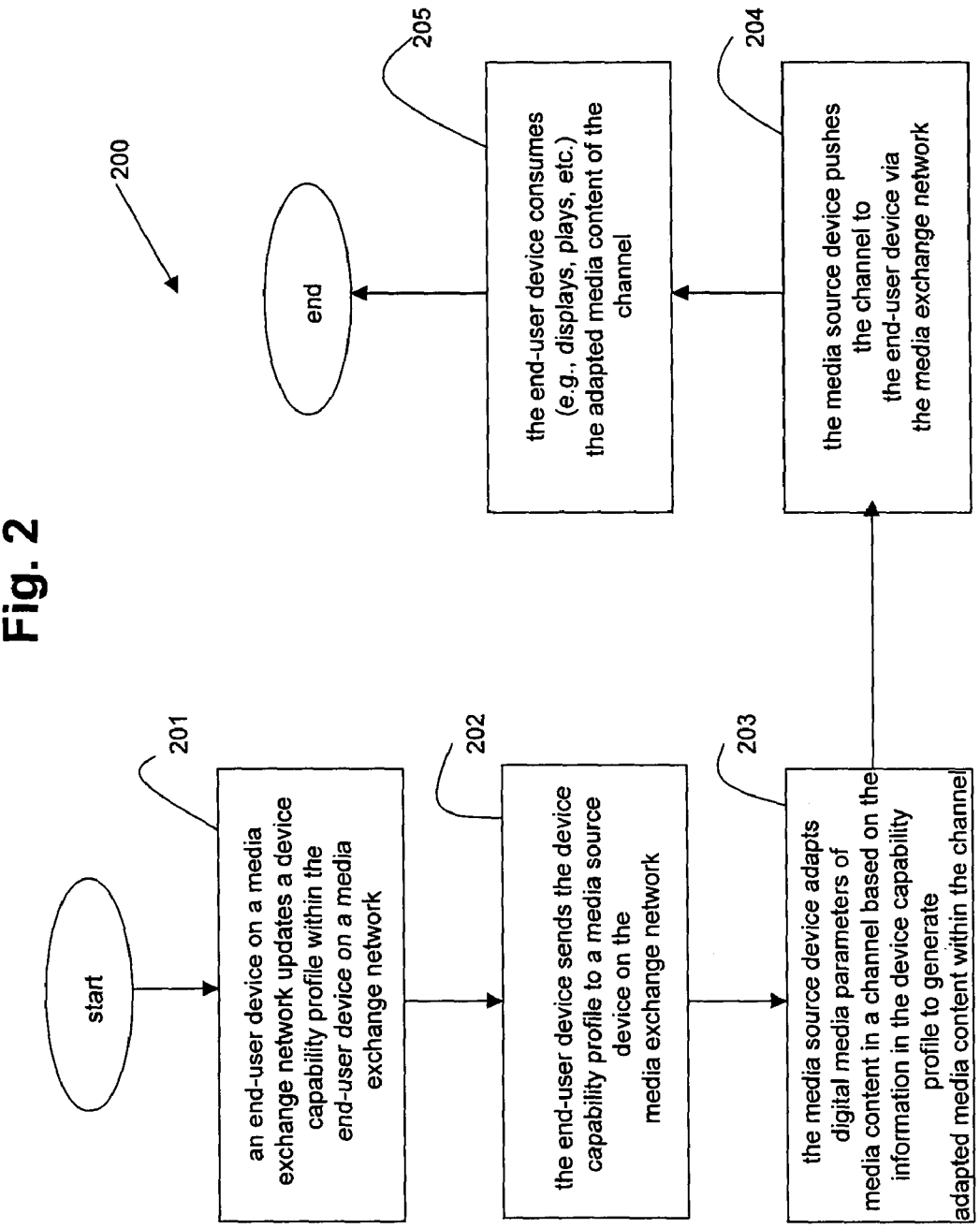
FIG. 2 is a flowchart illustrating an embodiment of a method that adapts digital media parameters based on end-user media consumption capabilities on the media exchange network according to the present invention.

FIG. 2 is a flowchart illustrating an embodiment of a method 200 that adapts digital media parameters based on end-user media consumption capabilities on the media exchange network 100 according to the present invention. In step 201, an end-user device on a media exchange network updates a device capability profile within the end-user device on a media exchange network. In step 202, the end-user device sends the device capability profile to a media source device on the media exchange network. In step 203, the media source device adapts digital parameters of media content in a channel associated with the end-user device based on the information in the device capability profile to generate adapted media content in the channel. In step 204, the media source device pushes the channel to the end-user device via the media exchange network. In step 205, the end-user device consumes (e.g., displays, plays, etc.) the adapted media content of the channel.

As an example, referring to FIG. 1, a user at the $2^{nd}$ home 108 has just upgraded the MPS 106 to include HDTV capability. The user at the $2^{nd}$ home 108 updates a device capability profile stored in the MPS 106 to indicate the HDTV capability. The MPS 106 then automatically sends the updated device capability profile to the MPS 102 at the $1^{st}$ home 104 over the media exchange network 100. The user of the MPS 102 at the $1^{st}$ home 104 desires to send a channel including a file of digital video to the user at the $2^{nd}$ home 108. The MPS 102 reads the updated device capability profile and proceeds to adapt the resolution and image size parameters of the digital video media in the channel to take advantage of the HDTV capability of the MPS 106. The MPS 102 then pushes the adapted channel with the adapted digital video media to the MPS 106 over the media exchange network. As a result, the user of the MPS 106 at the $2^{nd}$ home 108 may view the adapted digital video file while taking advantage of the maximum display capability (i.e., the HDTV capability) of the MPS 106.

In the case in which media content in a particular channel at a source is parameterized for high quality, constituting a large-sized file of media content in the channel, and the device capability of an end-user is of a lower quality (e.g., a substantially lower quality), the source may adapt the parameters of the media content in the channel to yield a lower quality media content that is compatible or more compatible with the end-user device. In addition, a substantially smaller-sized media content file is in the channel. As a result, when the adapted channel is sent to the end-user device, less bandwidth is required to transfer the channel in a given amount of time and/or less time is required to transfer the channel. It may not make sense to transfer the original, large-sized, high quality media file in the channel if the end-user device cannot take advantage of the extra quality.

In accordance with various embodiments of the present invention, whenever an end-user changes a device (e.g., a PC, an MPS or an MP) on the media exchange network, the end-user may manually update a corresponding device capability profile or the device capability profile may be automatically updated once the device is connected to the media exchange network. The updated device capability profile may then be manually or automatically sent to other users on the media exchange network such as, for example, friends and family members.

In accordance with an embodiment of the present invention, even though an end-user may have higher quality device capability, his device capability profile may indicate to only push media content of a lower quality to the end-user, for example, to keep down the cost of transferring the media content and to reduce the time taken to transfer the media content. A meta file may be associated and transferred with the media content in a channel. The meta file may include, for example, a pointer or an address that indicates where on the media exchange network a high quality version of the media content may be obtained, if desired. As a result, an end-user may receive media content in channels having parameters providing reasonable, but lower initial quality, and then have the option to obtain a higher quality version of the media content, if desired, based on the pointer information in the meta file associated with the media content.

For example, an end-user may desire to receive a certain image file in a channel having lower display quality for viewing on the end-user's PC monitor. However, if the end-user desires to print out the image, the end-user may desire an image file with higher image quality to obtain a high quality print of the image.

In accordance with an embodiment of the present invention, files of media content of the highest quality, known as "golden" files, may be archived somewhere on the media exchange network such as in, for example, the media storage server 116 of FIG. 1, instead of being stored on a user's PC or MPS since the "golden" files are typically very large in size. Any lower quality media file may have an associated meta file that points to the location of the corresponding "golden" file. If the storage location of the "golden" file moves, users on the media exchange network may be sent an updated meta file which points to the new location of the "golden" file. Such coordination and updating may be performed by a media exchange server, for example, in the media exchange network.

In accordance with another embodiment of the present invention, media parameter adaptation of files of media content may be performed by a media exchange server on the media exchange network. If a media file is to be transferred from a source device to an end-user device, then the media exchange server may serve as an intermediary to obtain and process device capability profiles and to adapt digital media parameters of media content of the files accordingly. The media exchange server also may coordinate the push of the media file in a channel.

Some embodiments according to the present invention may transfer and share many different types of digital media, data, and services between one device/location and another with ease while being able to index, manage, and store the digital media and data.

For example, it may be desirable to be able to distribute and store many types of digital media in a PC and/or a television environment in a user-friendly manner without using many different types of software applications and/or unique and dedicated interfaces. Any networking issues or other technical issues may be transparent to the users. It may also be desirable to use existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, via a TV channel guide look-and-feel user interface. The media exchange network also allows a user to construct personal media channels that comprise personal digital media (e.g., captured digital pictures, digital video, digital audio, etc.), request that third-party media channels be constructed from third-party digital media, and access the media channels pushed to the user by other users on the media exchange network.

PC's may be used but are not required to interface to the media exchange network for the purpose of exchanging digital media, data, and services. Set-top boxes or integrated MPS's may be used with the media exchange network to perform some or all of the previously described media exchange functions using, for example, a remote control with a television screen.

Set-top boxes may be software enhanced to create an MPS that provides full media exchange network interfacing and functionality via a TV screen with a TV guide look-and-feel. PC's may be software enhanced and may provide the same TV guide look-and-feel. Therefore, the media exchange network may support both PC's and MPS's in a similar manner. In accordance with an embodiment of the present invention, a fully integrated MPS may be designed from the ground up, having full MPS capability.

In the case of an MPS configuration, the user may use a remote control and a TV screen to access the media exchange network. In the case of a PC configuration, the user may use a keyboard and/or a mouse to access the media exchange network.

An MPS or an enhanced PC may provide, for example, a storage and distribution platform for the exchange of personal and third party digital media, data, and services as well as for bringing the conventional television channels to a user's home. An MPS and/or a PC may connect to the media exchange network via an existing communication infrastructure which may include, for example, a cable infrastructure, a DSL infrastructure, a satellite infrastructure, etc. The connection to the communication infrastructure may be hard-wired or wireless.

The media exchange network may allow users to effectively become their own broadcasters from their own homes by creating their own media channels and pushing those media channels to other authorized users on the media exchange network, such as friends and family members.

Figure 3:
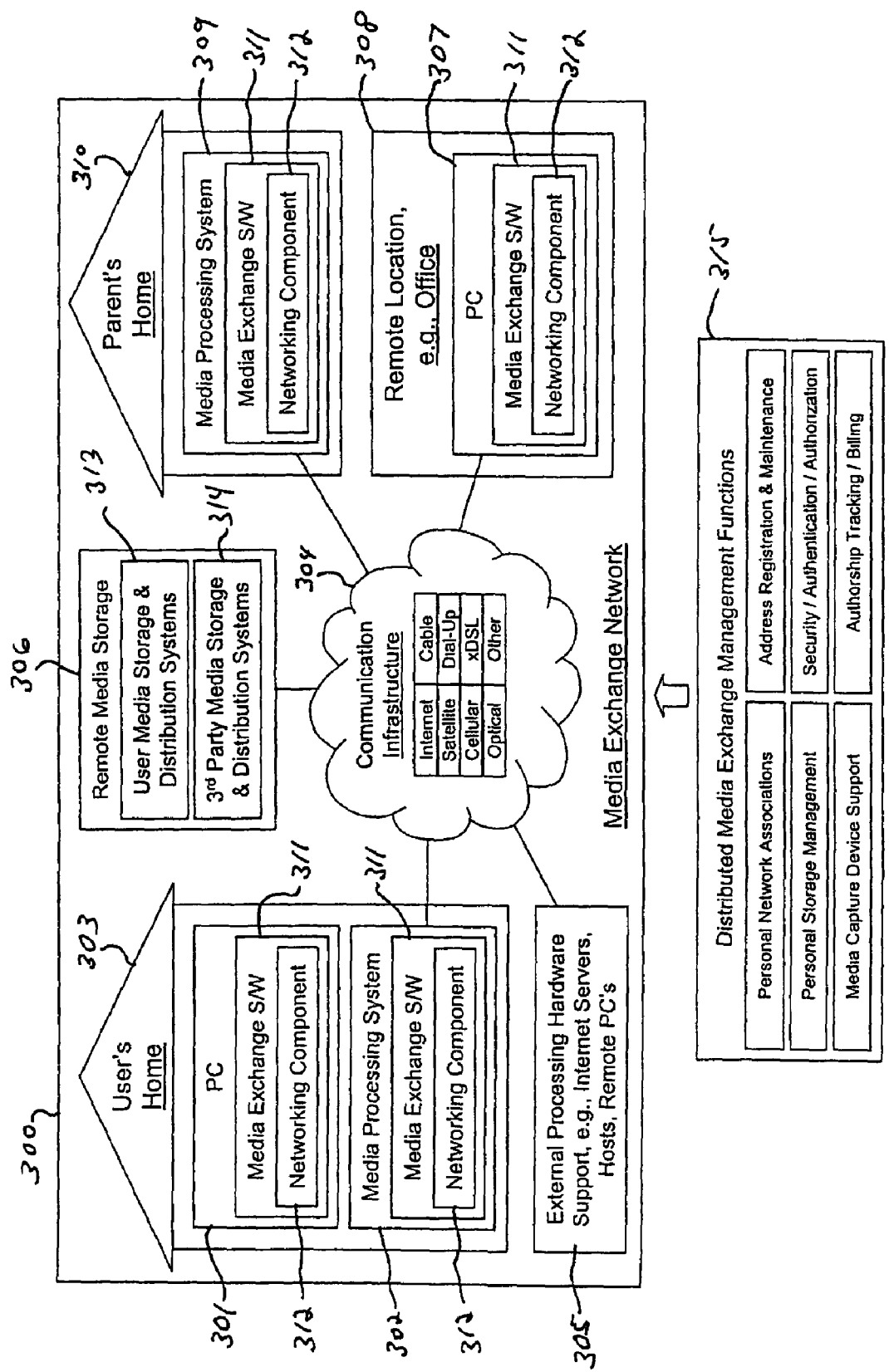
FIG. 3 is a schematic block diagram illustrating an embodiment of a media exchange network according to the present invention.

FIG. 3 illustrates a media exchange network 300 for exchanging and sharing digital media, data, and services in accordance with an embodiment of the present invention. The media exchange network 300 may comprise, for example, a secure, closed network environment that is only accessible to pre-defined users and service providers. The media exchange network of FIG. 3 comprises a first PC 301 and a first MPS 302 at a user's home 303, a communication infrastructure 304, an external processing hardware support 305, a remote media storage 306, a second PC 307 at a remote location 308 such as an office, and a second MPS 309 at a parent's home 310.

The PC's 301 and 307 and the MPS's 302 and 309 may each include a media exchange software (MES) platform 311 and a networking component 312 for connectivity. The MES platform 311 provides multiple capabilities including, for example, media "push" capability, media "access" capability, media channel construction/selection, image sequence selection, text and voice overlay, channel and program naming, inter-home routing selection, authorship and media rights management, shared inter-home media experience, billing service, and an integrated TV channel guide look-and-feel.

The external processing hardware support 305 may comprise, for example, at least one server such as a centralized Internet server, a peer-to-peer server, or a cable headend. The server may alternatively be distributed over various hosts or remote PC's. The MES platform 311 may reside on the external processing hardware support server 305. The remote media storage 306 may comprise, for example, user media storage and distribution systems 313 and/or third party media storage and distribution systems 314.

The communication infrastructure 304 may comprise, for example, at least one of an Internet infrastructure, a satellite infrastructure, a cable infrastructure, a dial-up infrastructure, a cellular infrastructure, an xDSL infrastructure, an optical infrastructure, or some other infrastructure. The communication infrastructure 304 may link the user's home 303, the parent's home 310, the remote media storage 306, and the remote location office 308 to each other (e.g., the communication infrastructure 304 may link all users and service providers of the media exchange network 300).

The various functions 315 of the media exchange network 300 may comprise, for example, generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated into the PC 301 at the user's home 303.

Figure 4:
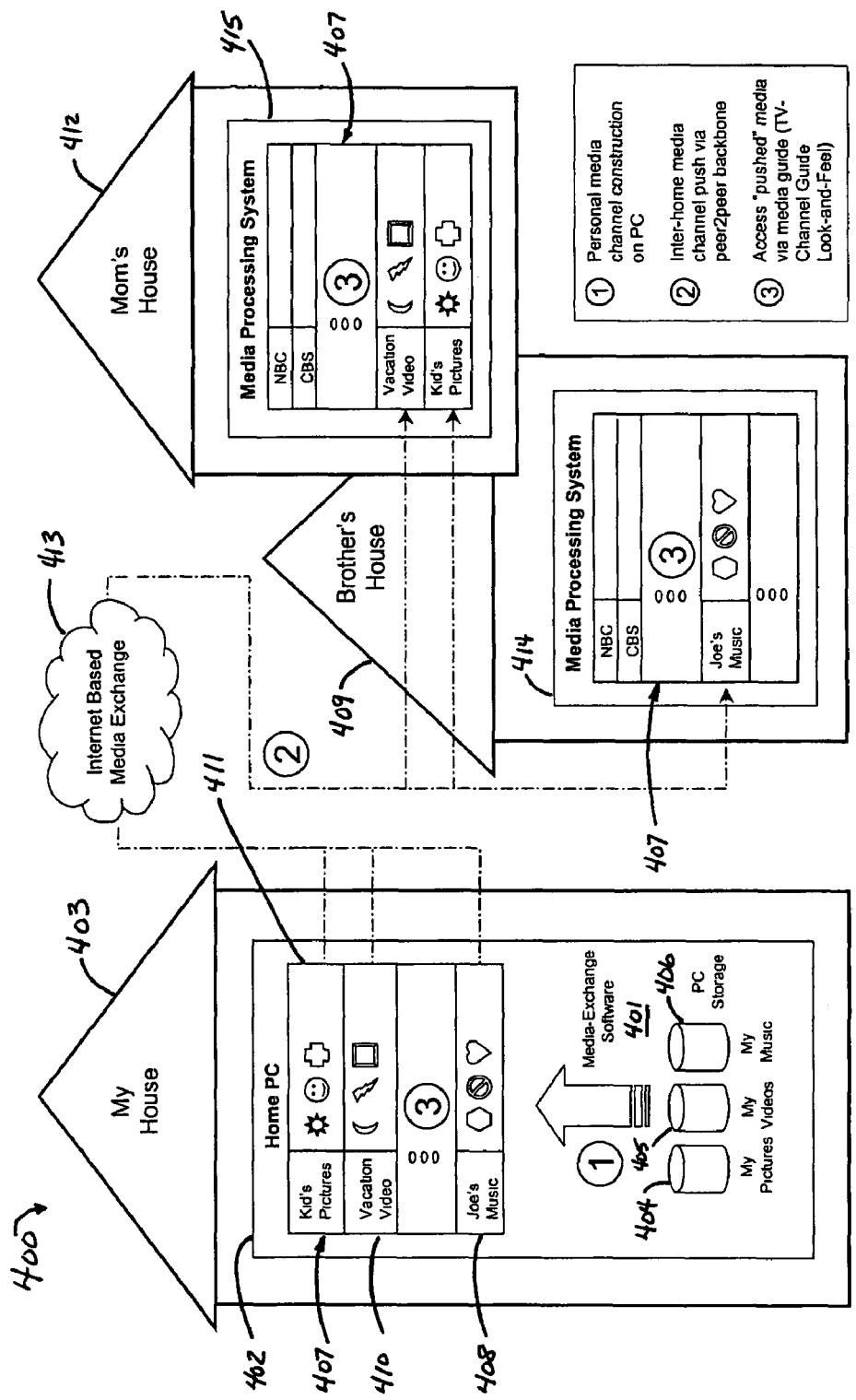
FIG. 4 is a schematic block diagram illustrating an exchange of personal media exchange over a media exchange network according to the present invention.

FIG. 4 illustrates an example of a personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a TV channel guide look-and-feel user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the Internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a TV channel guide look-and-feel user interface 407.

In step 3, brother and/or Mom access the pushed media channels via their respective media processing systems (MPS's) 414 and 415 using their respective MPS TV screens and remote controls.

Figure 5:
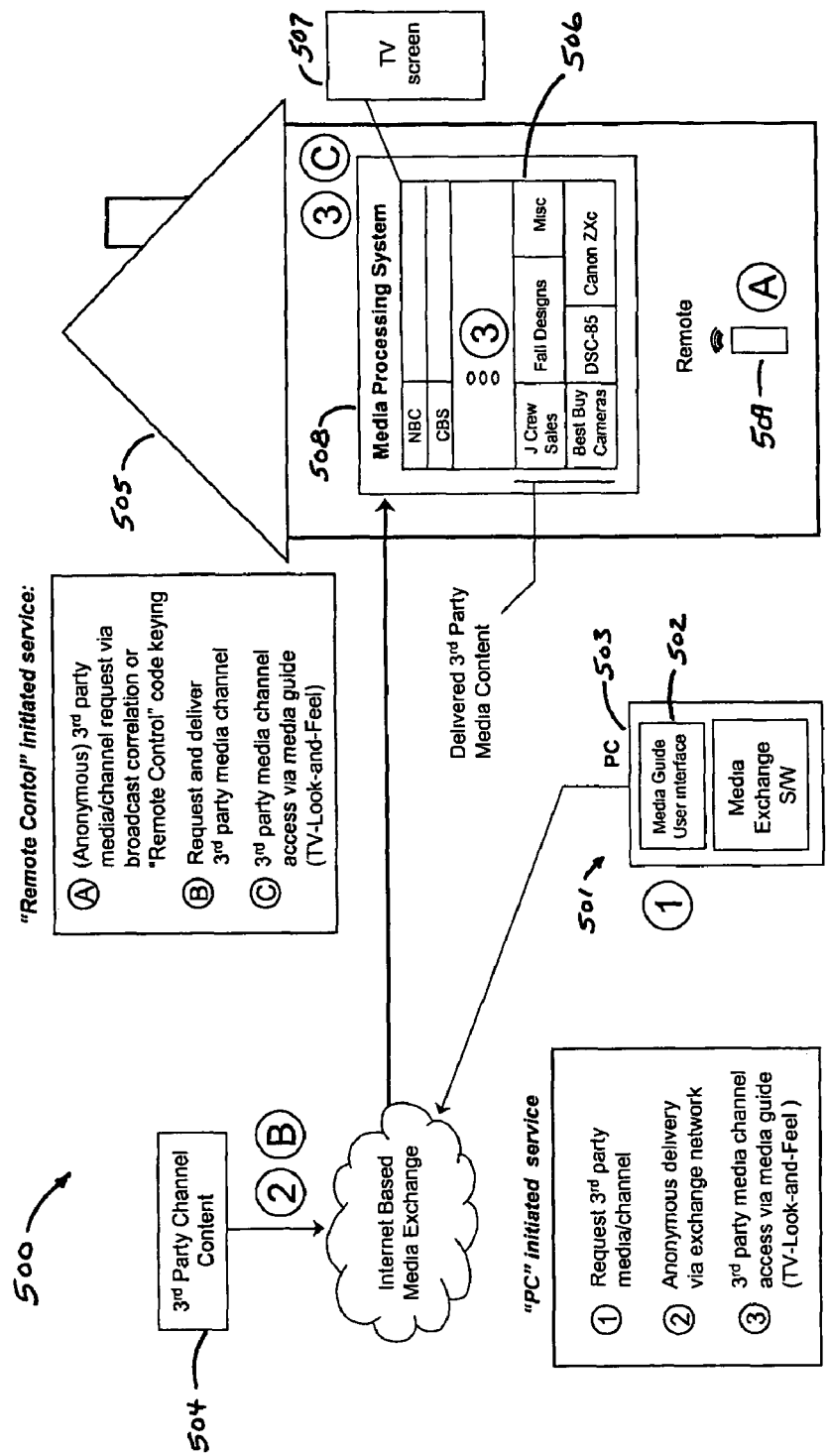
FIG. 5 is a schematic block diagram illustrating an exchange of third-party media over a media exchange network according to the present invention.

FIG. 5 illustrates an example of a third-party media exchange over a media exchange network 500 in accordance with an embodiment of the present invention. In step 1, a PC-initiated third-party request is made by a first party 501 via an Internet-based media exchange network 500 using a TV channel guide look-and-feel user interface 502 on a PC 503. In step 2, an anonymous delivery of the requested third-party channel 504 is made to a second party 505 via the Internet-based media exchange network 500. In step 3, the second party 505 accesses the third-party channel 504 using a TV channel guide look-and-feel user interface 506 on a TV screen 507 that is integrated into an MPS 508.

Similarly, in step A, an MPS-initiated third-party request is made by a second party 505 via an Internet-based media exchange network 500 using a TV channel guide look-and-feel user interface 506 on a TV screen 507 using a remote control 509. The second party 505 may key in a code, using the remote control 509, that is correlated to a commercial or some other third party broadcast media. In step B, an anonymous delivery of the requested third-party channel 504 is made to a first party 501 via the Internet-based media exchange network 500. In step C, the first party 501 accesses the third-party channel 504 using a TV channel guide look-and-feel user interface 502 on a PC 503.

Figure 6:
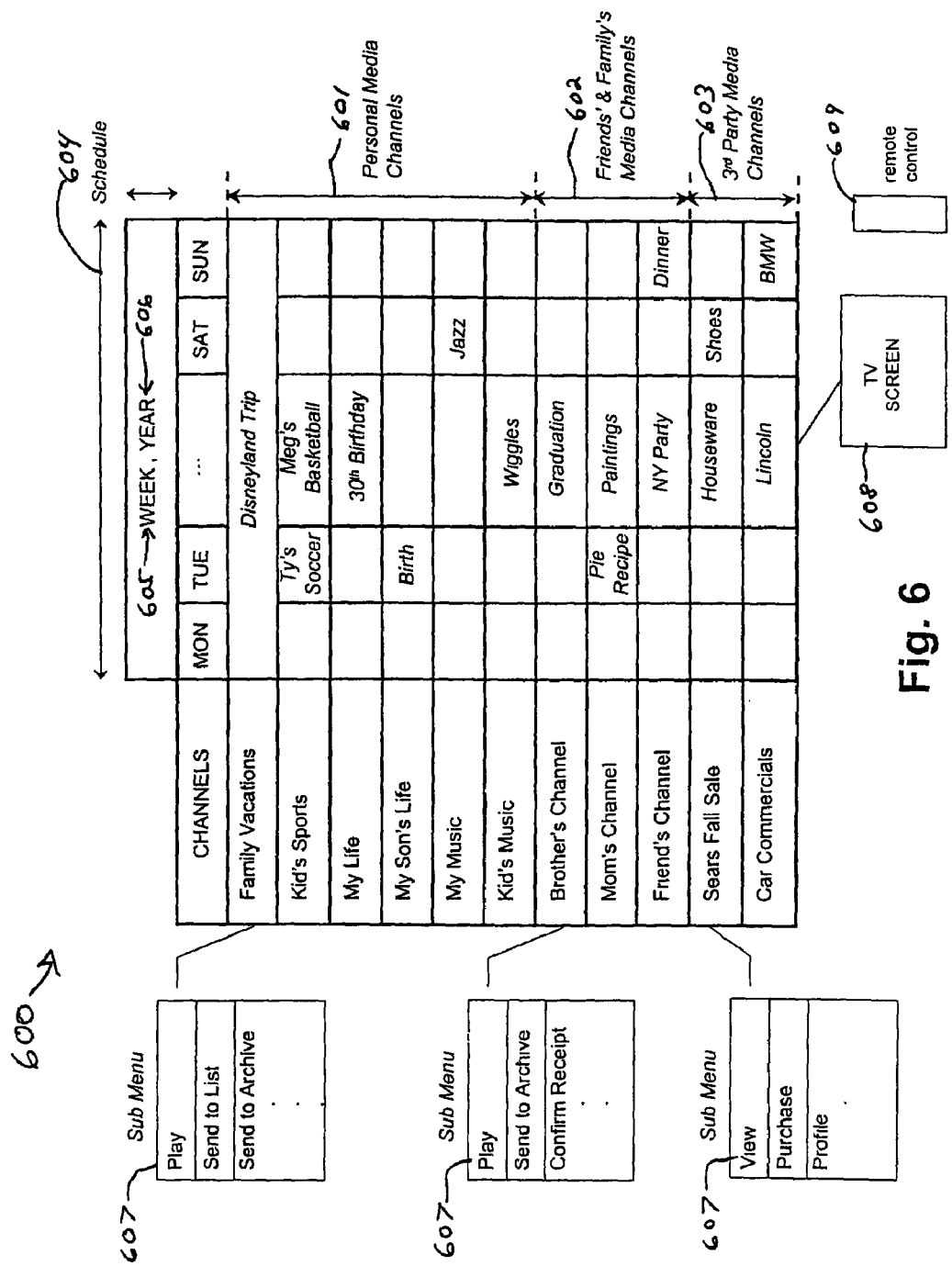
FIG. 6 illustrates an embodiment of a television (TV) guide channel user interface according to the present invention.

FIG. 6 illustrates a TV channel guide user interface 600 in accordance with an embodiment of the present invention. The TV channel guide user interface 600 may be displayed on a TV screen 608 and controlled by a remote control device 609. Also, the TV channel guide user interface 600 may be displayed on a PC monitor and controlled by a keyboard or a mouse.

The TV channel guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as, for example, "play", "send to list", "send to archive", "confirm receipt", "view", "purchase", and "profile".

Figure 7:
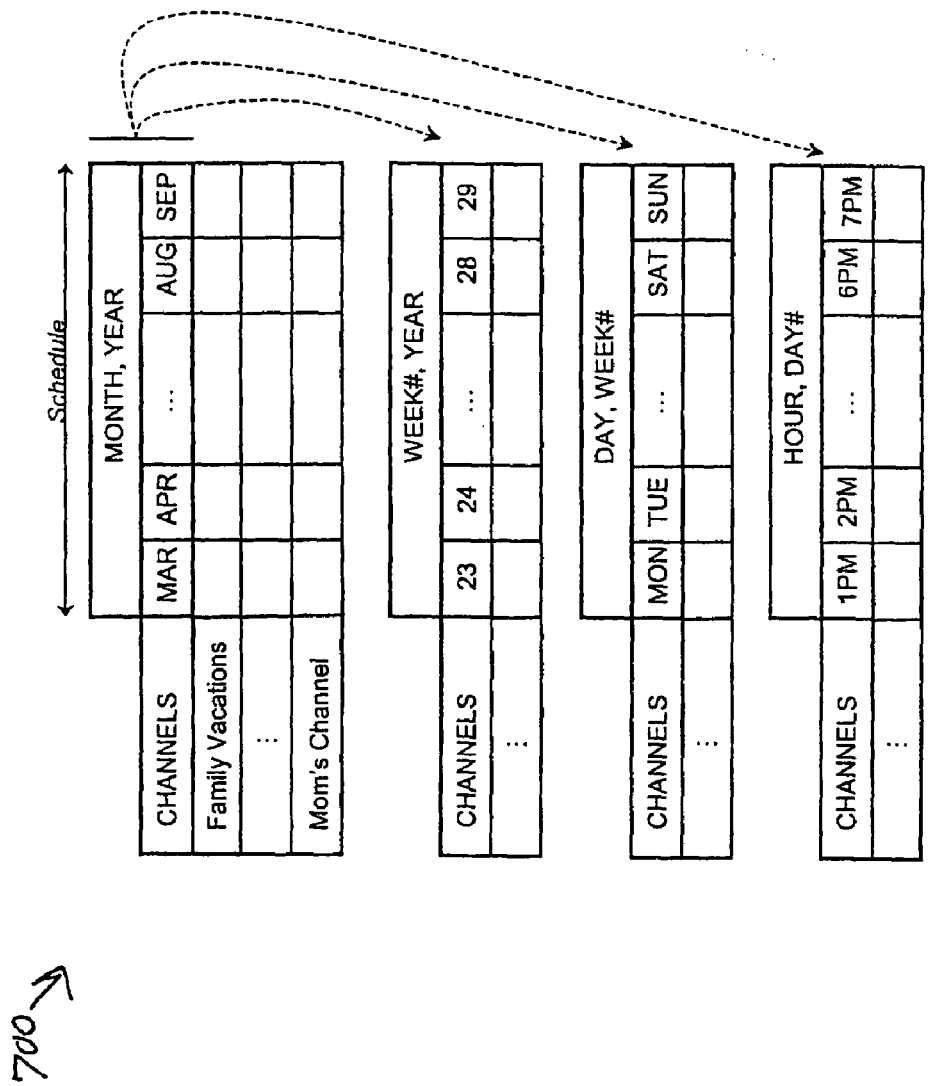
FIG. 7 illustrates an embodiment of a TV guide channel user interface according to the present invention.

FIG. 7 illustrates possible multiple instantiations of a TV channel guide user interface 700 in accordance with an embodiment of the present invention. The TV channel guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The TV channel guide user interface 800 may give the friend several options 801 for accepting and downloading the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing may comprise, for example, buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
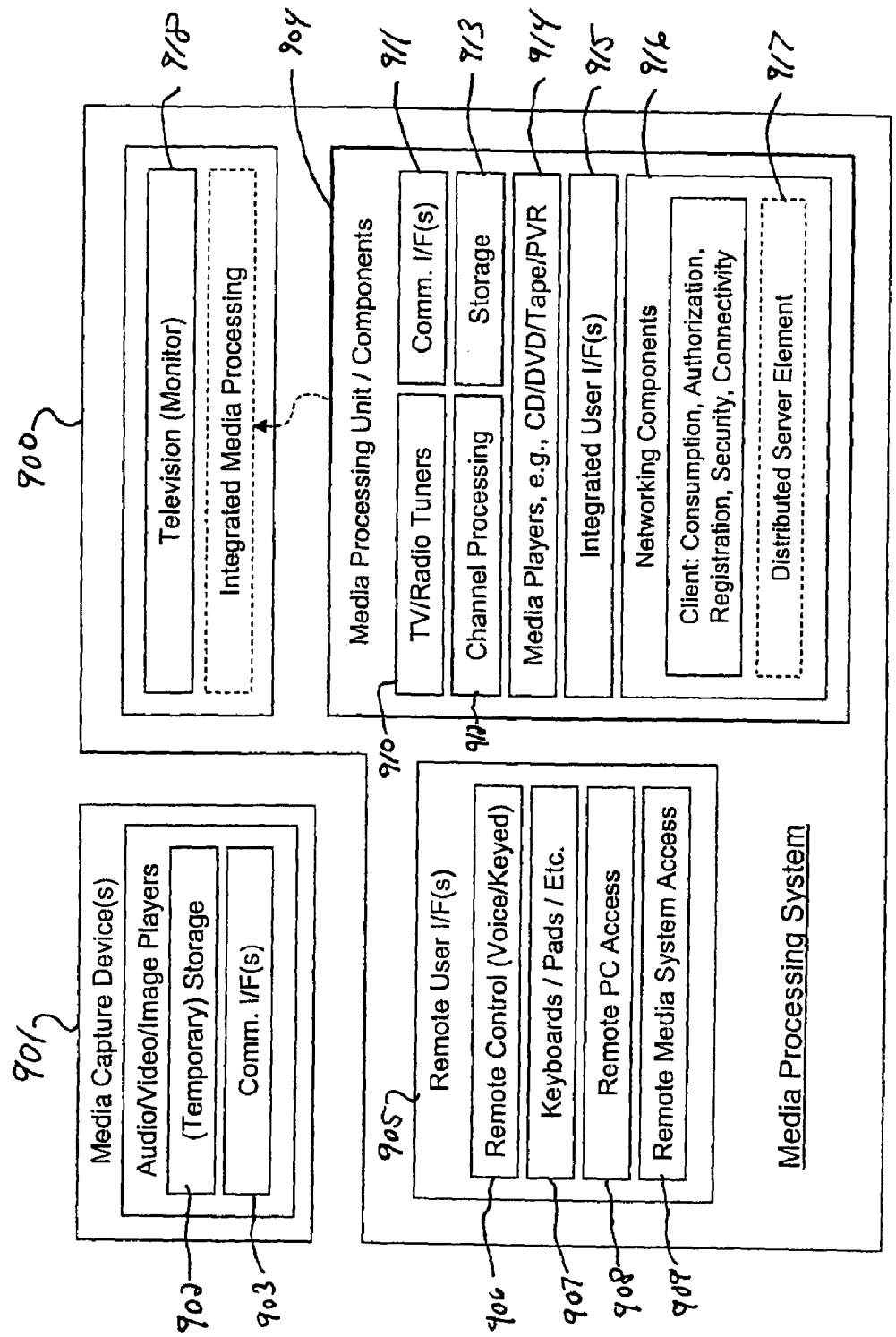
FIG. 9A is a schematic block diagram illustrating an embodiment of a media processing system (MPS) interfacing to media capture peripherals according to the present invention.

FIG. 9A illustrates some elements of a media processing system (MPS) 900 and media capture devices 901 in accordance with an embodiment of the present invention. The media capture devices 901 may comprise, for example, audio, video, and image players, such as digital cameras, digital camcorders, and MP3 players, that each may include, for example, a temporary storage area 902 and a communication interface 903 such as, for example, a wired interface (e.g., a USB interface) or a wireless interface. The media capture devices 901 may interface to an MPS and a PC.

The MPS 900 may comprise, for example, a media processing unit (MPU) 904, remote user interface(s) 905, and a TV screen 918 to provide integrated media processing capability and indirect user interface capability. The remote user interfaces 905 may comprise, for example, a voice or keyed remote control 906, keyboards and pads 907, a remote PC access interface 908, and a remote media system access interface 909 (e.g., providing access from another MPS).

The media processing unit (MPU) 904 may comprise, for example, TV and radio tuners 910 for image and audio consumption, communications interfaces 911, channel processing 912 (e.g., creating, storing, indexing, viewing), storage 913, media players 914 (e.g., CD players, DVD players, tape players, PVRs and MP3 players), an integrated user interface 915 (e.g., to provide a TV channel guide look-and-feel), networking components 916 to provide client functions such as, for example, consumption (e.g., billing), authorization (e.g., using digital certificates and digital ID's), registration, security, and connectivity. In accordance with an embodiment of the present invention, the networking components 916 may include a distributed server element 917 that is part of a distributed server.

Figure 9B:
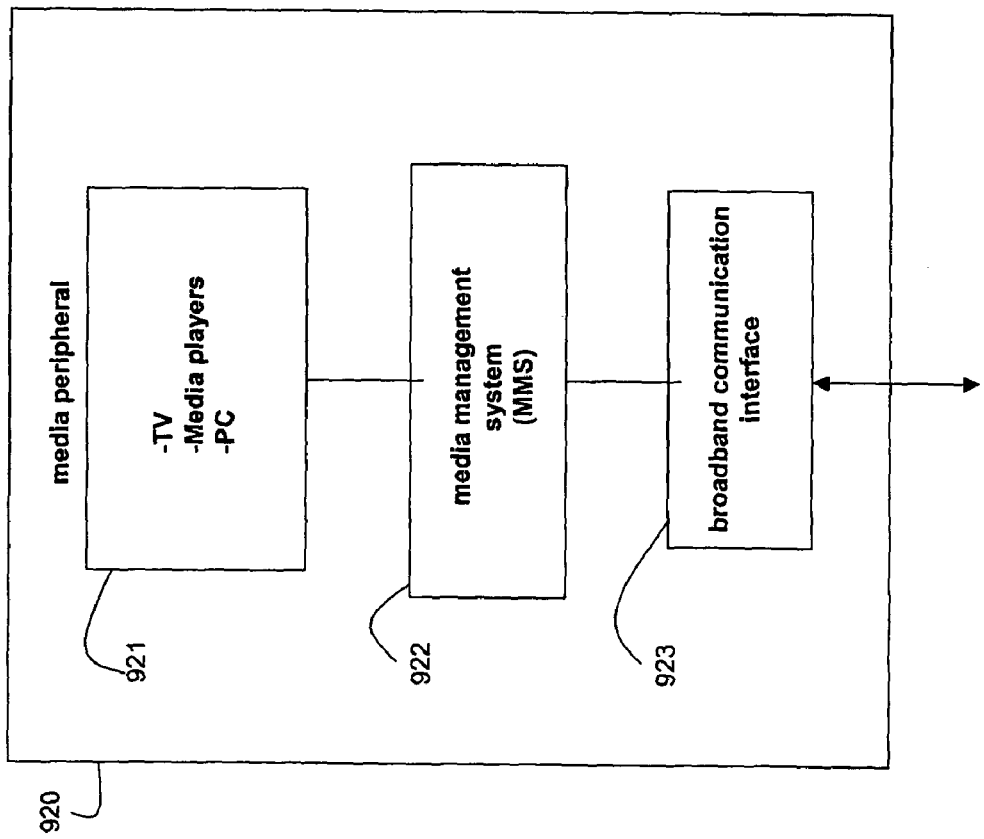
FIG. 9B illustrates an embodiment of an MPS according to the present invention.

FIG. 9B illustrates an embodiment of a media processing system (MPS) 920 in accordance with various aspects of the present invention. The MPS 920 may comprise, for example, an enhanced set-top box for viewing and interacting with various user interfaces, media, data and services that are available on the media exchange network using, for example, a remote control. The MPS 920 may comprise, for example, a media peripheral 921, a media management system (MMS) 922 and a broadband communication interface 923.

The media peripheral 921 may include, for example, a TV, a PC and media players (e.g., a CD player, a DVD player, a tape player and an MP3 player) for video, image and audio consumption of broadcast channels and/or personal channels. The broadband communication interface 923 may include, for example, internal modems (e.g., a cable modem or a DSL modem) or other interface devices to communicate with, for example, a cable or satellite headend.

The MMS 922 may include a software platform to provide functionality including, for example, media "push" capability, media "access" capability, media channel construction/selection, image sequence selection, text and voice overlay, channel and program naming, inter-home routing selection, authorship and media rights management, shared inter-home media experience, billing service and a media guide user interface providing an integrated TV channel guide look-and-feel.

Figure 10:
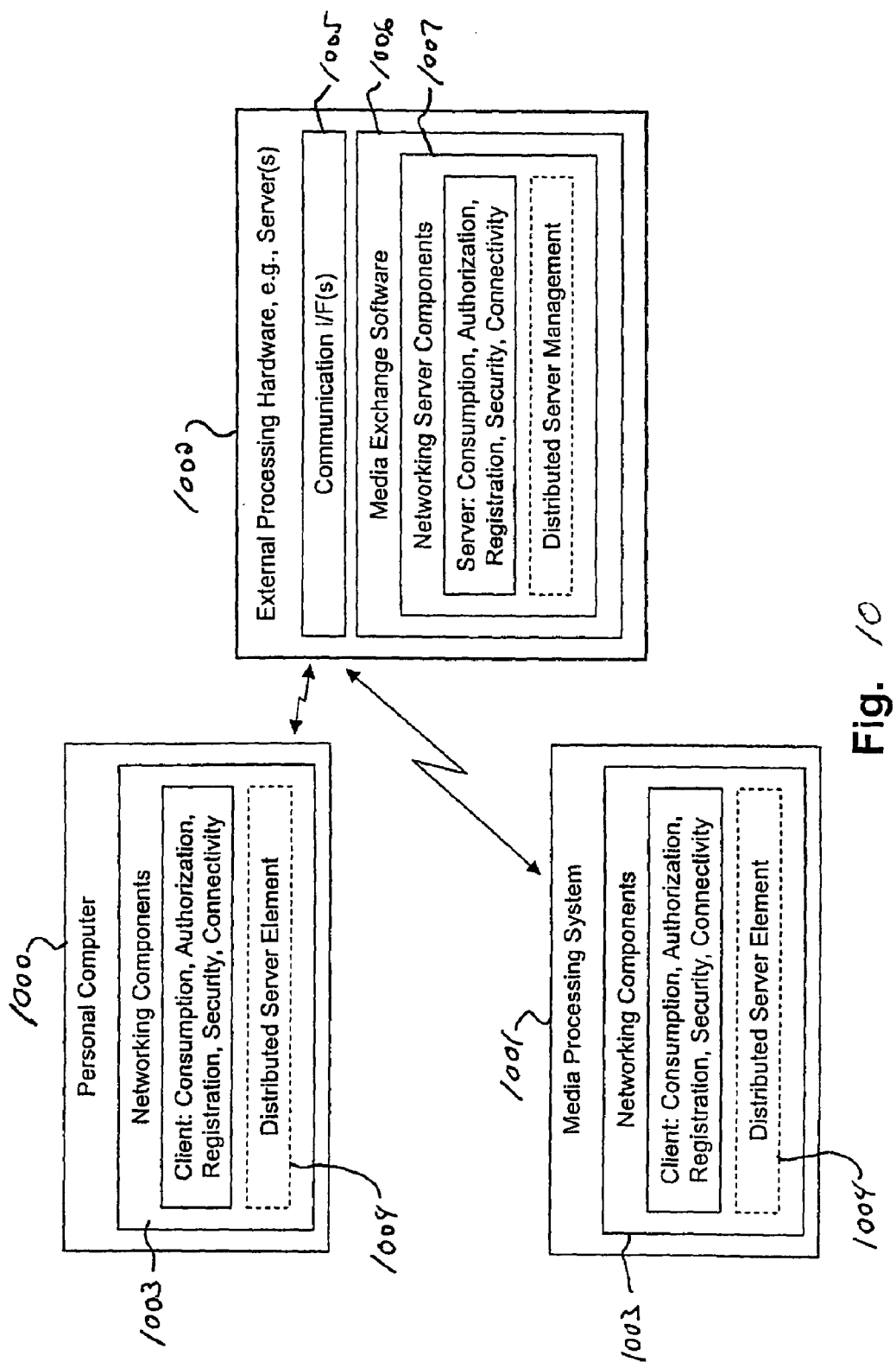
FIG. 10 is a schematic block diagram illustrating an embodiment of a personal computer (PC) and an MPS interfacing to a server on a media exchange network according to the present invention.

FIG. 10 illustrates connectivity between a PC 1000, an MPS 1001, and an external processing hardware 1002 (e.g., a server) in accordance with an embodiment of the present invention. The PC 1000 and the MPS 1001 may include networking components 1003 to provide client functions such as, for example, consumption (e.g., billing), authorization, registration, security, and connectivity. In accordance with various embodiments of the present invention, the PC 1000 and the MPS 1001 may include a distributed server element 1004 that is part of a distributed server.

The PC 1000 and the MPS 1001 may connect to the external processing hardware 1002 via wired connections or wireless connection in accordance with various embodiments of the present invention. The external processing hardware 1002 may comprise, for example, a distributed server or peer-to-peer server. The external processing hardware 1002 also may comprise communication interfaces 1005 (e.g., cable interfaces, optical interfaces, etc.) and a media exchange software (MES) platform 1006. The MES platform 1006 in the external processing hardware 1002 may allow for communication with the PC 1000 and the MPS 1001 which may also use the same MES platform 1006. The external processing hardware 1002 may also include networking server components 1007 to provide the similar client functions such as, for example, consumption (e.g., billing), authorization, registration, security, and connectivity at the server side.

Figure 11:
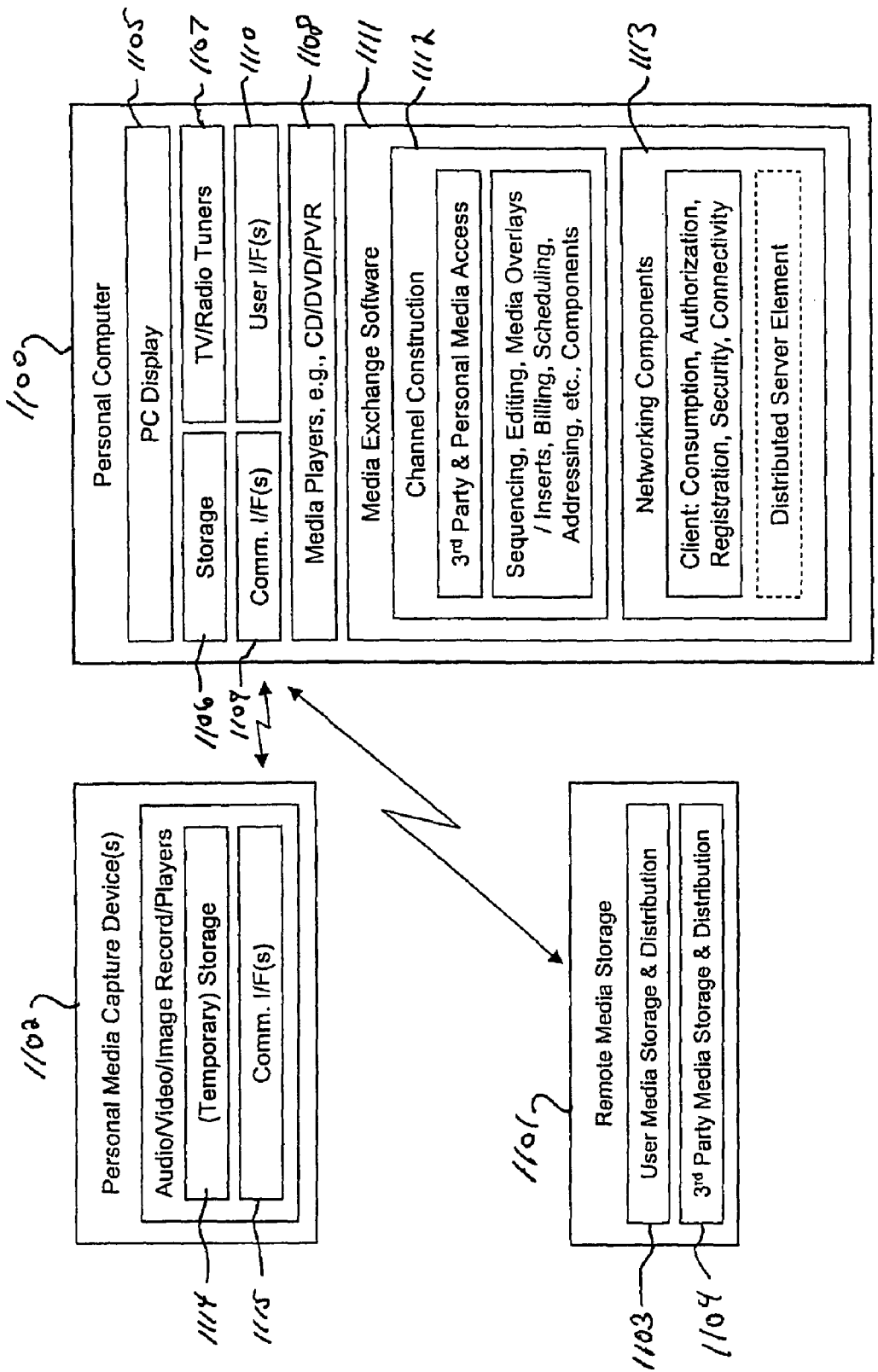
FIG. 11 is a schematic block diagram illustrating an embodiment of a PC interfacing to personal media capture devices and remote media storage on a media exchange network according to the present invention.

FIG. 11 illustrates connectivity between a PC 1100, a remote media storage 1101, and personal media capture devices 1102 when the PC 1100 is used as the primary distributor of digital media such as in the case of a PC-to-PC operation, in accordance with an embodiment of the present invention. The personal media capture devices 1102 and the remote media storage 1101 may connect to the PC 1100 via a wireless connection or a wired connection. The remote media storage 1101 may provide user media storage and distribution 1103 as well as third party media storage and distribution 1104. The personal media capture devices 1102 may provide temporary storage 1114 and communication interfaces 1115.

Viewing may be done using a PC monitor 1105 instead of a television screen in accordance with various embodiments of the present invention. The PC 1100 may include, for example, storage 1106, TV/radio tuners 1107 for media consumption, media players 1108, and communication interfaces 1109 and user interfaces 1110 similar to those for the MPS of FIG. 9. The PC 1100 may include a media exchange software (MES) platform 1111 that provides channel construction capability 1112 and networking capability 1113. The channel construction capability 1112 may provide, for example, third party and personal media access, sequencing, editing, media overlays and inserts, billing, scheduling, and addressing.

In summary, some embodiments of the present invention may relate to systems and methods that support adaptive media parameters on a media exchange network. Media parameters such as, for example, resolution, image size, audio quality, etc. may be adapted for certain media content to make the media content more compatible with end-user device capabilities.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. In a media exchange network comprising a media exchange server, a network, a first private home and a second private home, the media exchange server being external to the first private home and to the second private home, a system for adapting media content, comprising:

a first communications device disposed in the first private home, wherein the first communications device is a first media content source, wherein the first communications device is operatively coupled to the network via a first broadband access headend, wherein the first communications device updates a device profile within the first communications device, wherein the device profile includes capabilities of the first communications device, wherein the first communications device automatically sends the updated device profile to a second communications device in a second private home, wherein the first communications device comprises a first media processing system, wherein the first media processing system comprises a first software platform that provides at least the following: user interface functionality, distributed storage functionality, networking functionality, control over first media peripheral devices in the first private home, status monitoring of the first media peripheral devices, and inter-home routing to other communication devices including the inter-home routing to the second communications device in the second private home; and the second communications device disposed in the second private home, wherein the second communications device is a second media content source, wherein the second communications device is operatively coupled to the network via a second broadband access headend, wherein the second communications device receives the updated device profile relating to the first communications device, wherein the second communications device adapts media content based upon the updated device profile of the first communications device to form adapted media content, wherein the adapted media content is set to a first quality level that is lower than a second quality level, wherein the first quality level and the second quality level are supported by the first communications device, wherein the second communications device pushes, in a private, non-broadcast channel, the adapted media content with a file associated with the media content to the first communications device, wherein the file comprises information as to where the media content of a highest quality level is stored outside of the first private home and the second private home, wherein the second communications device comprises a second media processing system, wherein the second media processing system comprises a second software platform that provides at least the following: user interface functionality, distributed storage functionality, networking functionality, control over second media peripheral devices in the second private home, status monitoring of the media peripheral devices, and inter-home routing to other communication devices including the inter-home routing to the first communications device in the first private home, wherein the first communications device and the second communications device use respective TV channel guide look-and-feel user interfaces to display private, non-broadcast channels and public broadcast channels from the other of the first communications device and the second communications device, wherein the private, non-broadcast channels displayed in the first private home comprise the private, non-broadcast channel originally constructed, originally sourced, and sent by the second communications device and private, non-broadcast channels originally constructed and originally sourced by the first communications device.

2. The system according to claim 1, wherein the first communications device is coupled to the network via a satellite headend, wherein the second communications device is coupled to the network via a DSL headend, and wherein the satellite headend and the DSL headend are configured to provide distributed network capability, digital media parameter adaption, archival functionality, storage, storage management and digital rights management.

3. The system according to claim 1, wherein the highest quality level is higher than the first quality level and the second quality level, wherein the media content of the highest quality level is stored in the media exchange server.

4. The system according to claim 1, wherein, after the first communications device receives the adapted media content at the first quality level with the file, the first communications device uses the file to request the media content at the highest quality level from the media exchange server.

5. The system according to claim 1, wherein a private, non-broadcast channel displayed in the second private home comprises a private, non-broadcast channel originally constructed, originally sourced, and sent by the first communications device and private, non-broadcast channels originally constructed and originally sourced by the second communications device.

6. The system according to claim 1, wherein the TV channel guide look-and-feel user interfaces are navigated using corresponding remote controls and displays.

7. The system according to claim 6, wherein the media exchange server communicates with the first communications device through the first broadband access headend, and wherein the media exchange server communicates with the second communications device though the second broadband access headend.

8. The system according to claim 1, wherein the first media processing system of the first communications device in the first private home and the second media processing system of the second communications device in the second private home each provide media push capability, media access capability, media channel construction, media channel selection, image sequence selection, text and voice overlay, channel and program naming, inter-home routing selection, authorship, media rights management, and shared inter-home media experience.

9. The system according to claim 1, wherein the private, non-broadcast channel sent by the second communications device comprises second home videos and second personal pictures stored at the second private home, and wherein the private, non-broadcast channels originating from the first communications device comprises first home videos and first personal pictures stored at the first private home.

10. The system according to claim 1, wherein the first communications device and the second communications device each provide respective channel construction capability, networking capability, third party media access, personal media access, sequencing, editing, media overlays, media inserts, billing, scheduling and addressing.

11. The system according to claim 1, wherein the first communications device can select from different delivery options of the media content from the second communications device based on cost.

12. The system according to claim 1, wherein the media exchange network supports generating personal network associations, personal storage management, media capture device support, security/authentication/authorization support, authorship tracking, billing, and address registration and maintenance.

13. The system according to claim 1, wherein the first media peripheral devices in the first private home and the second media peripheral devices in the second private home comprises digital cameras and digital camcorders.

14. The system according to claim 1, comprising:
a third party media server is coupled to the network,
wherein the first communications device communicates with the third party media server through the first broadband access headend and the network,
wherein the second communications device communicates with the third party media server through the second broadband access headend and the network, and
wherein the first communications device in the first private home uses its TV channel guide look-and-feel user interface to send a request from the first communications device to the third party media server to anonymously send third party media content to the second communications device in the second private home.

15. The system according to claim 1, wherein the the private, non-broadcast channel originally constructed, originally sourced, and sent by the second communications device is accessible for viewing by the first communications device as per a schedule set up by the second communications device.

16. The system according to claim 1, wherein the first communications device and the second communications device each provide channel creating, storing, indexing and viewing.

17. A system for adapting media content, comprising:
a set-top box system disposed in a private home, wherein the set-top box system is operatively coupled to a network that extends outside the private home, wherein the set-top box system revises a device profile of the set-top box system, wherein the set-top box system stores the revised device profile of the set-top box system, wherein the set-top box system automatically sending the revised device profile to the network, wherein the set-top box system receives a file, pushed from an other set-top box system outside the private home in a non-broadcast channel, associated with media content and the media content that has been adapted based upon the revised device profile, wherein the non-broadcast channels comprise non-broadcast channels originally constructed, originally sourced, and sent by other set-top box systems and non-broadcast channels originally constructed and originally sourced by the set-top box system, wherein the adapted media content is set, by the other set-top box system that sent the adapted media content, to a first quality level that is lower than a second quality level, wherein the first quality level and the second quality level are supported by the set-top box system, wherein the file is associated with the media content and identifies a location where the media content of a highest quality is stored, wherein the location where the media content of the highest quality is stored is not the other set-top box system that sent the adapted media content,
wherein each of the set-top box system and the other set-top box system comprises a media processing system, wherein the media processing system comprises a software platform that provides at least the following: user interface functionality, distributed storage functionality, networking functionality, control over media peripheral devices in the private home, status monitoring of the media peripheral devices, and inter-home routing to other set-top box systems,
wherein each set-top box system uses a TV channel guide look-and-feel user interface to display non-broadcast channels from each other and broadcast channels.

18. The system according to claim 17, wherein each set-top box system provides media push capability, media access capability, media channel construction, media channel selection, image sequence selection, text and voice overlay, channel and program naming, inter-home routing selection, authorship, media rights management, and shared inter-home media experience.

19. The system according to claim 17, wherein, after the set-top box system receives the adapted media content at the first quality level with the file, the first set-top box uses the file to request the media content at the highest quality level from a source identified in the file, wherein the source is not one of the other set-top box systems.

20. The system according to claim 17, comprising:
a third party media server is coupled to the network,
wherein the set-top box system communicates with the third party media server through a first broadband access headend and the network,
wherein the other set-top box system communicates with the third party media server through a second broadband access headend and the network, and
wherein the set-top box system uses its TV channel guide look-and-feel user interface to generate and to send a request from the set-top box system to the third party media server to anonymously send third party media content to the other set-top box system.

21. A system for adapting media content, comprising:
a communications device disposed in a private home, the communications device being operatively coupled to a network that extends beyond the private home, the communications device receiving, from the network, a revisable device profile of a display that is external to the private home, adapting media content based upon the received device profile from another communications device external to the private home, and sending, in a non-broadcast channel that is displayed on the display in a TV channel guide look-and-feel manner, a file associated with the media content and the adapted media content to the network,
wherein each communications device comprises a media processing system, the media processing system comprising a software platform that provides user interface functionality, distributed storage functionality, networking functionality, control over media peripheral devices in the private home, status monitoring of the media peripheral devices, and inter-home routing to other communications devices,
wherein each communications device uses a TV channel guide look-and-feel user interface to display non-broadcast channels from each other and broadcast channels,
wherein the non-broadcast channels comprise non-broadcast channels originally constructed, originally sourced and sent by other communications devices and non-broadcast channels originally constructed and originally sourced by the communication device, wherein the adapted media content is set to a first quality level that is lower than a second quality level, the first quality level and the second quality level being supported by the display, wherein the file comprises information as to a location where the media content of a highest quality level resides, wherein the location is different from a source of the adapted media content, and wherein each communications device provides media push capability, media access capability, media channel construction, media channel selection, image sequence selection, text and voice overlay, channel and program naming, inter-home routing selection, authorship, media rights management, and shared inter-home media experience.

22. A method for adapting media content, comprising:

updating, by a second communications device, a device profile stored in the second communications device, wherein the device profile includes capabilities of the second communications device, wherein the second communications device is disposed in a second private home;

automatically sending the updated device profile from the second communications device to a first communications device over a network, wherein the first communications device is disposed in a first private home, wherein the network extends outside the first private home and the second private home, wherein each of the first communications device and the second communications device comprises a media processing system, wherein the media processing system comprises a software platform that provides at least the following: user interface functionality, distributed storage functionality, networking functionality, control over media peripheral devices in the private home corresponding to the respective communications device, status monitoring of the media peripheral devices in the private home corresponding to the respective communications device, and inter-home routing to other communications devices including the first communications device and the second communications device;

receiving, by the first communications device, the updated device profile sent by the second communications device;

adapting, by the first communications device, media content based upon the updated device profile, wherein the adapted media content is set to a first quality level that is lower than a second quality level that is supported by the second communications device, wherein a file comprises information identifying where the media content of a highest quality level is stored, and wherein the information identifies a location that is different from the first communications device;

pushing, in a non-broadcast channel, the file associated with the media content and the adapted media content to the second communications device; and providing, by the second communications device, a TV channel guide look-and-feel user interface to display non-broadcast channels and broadcast channels, wherein the non-broadcast channels displayed in the second private home by the second communications device comprise the non-broadcast channel originally constructed, originally sourced and sent by the first communications device and non-broadcast channels originally constructed and originally sourced by the second communications device.

23. The method according to claim 22, wherein, after the second communications device receives the adapted media content at the first quality level with the file, the second communications device uses the file to request the media content at the highest quality level from a source identified in the file, wherein the source is not the first communications device and the second communications device.

24. The method according to claim 22, wherein the non-broadcast channels displayed in the first home comprise a non-broadcast channel originally constructed, originally sourced, and sent by the second communications device and non-broadcast channels originally constructed and originally sourced by the first communications device.

25. The method according to claim 24, wherein the non-broadcast channel originally constructed, originally sourced, and sent by the first communications device is accessible for viewing by the second communications device as per a schedule set up by the first communications device.

26. The method according to claim 22, wherein the first communications device communicates with a third party media server through the network, wherein the second communications device communicates with the third party media server through the network, and wherein the first communications device in the first home uses its TV channel guide look-and-feel user interface to send a request from the first communications device to the third party media server to anonymously send third party media content to the second communications device in the second home.

27. A method for adapting media content, comprising:

storing, in a first communications device system in a private home, a revisable device profile of the first communications device system, wherein the first communications device system is coupled to a network that extends beyond the private home, wherein the revisable device profile includes capabilities of the first communications device system;

updating, by the first communications device system, the revisable device profile of the first communications device system;

automatically sending, over the network by the first communications device system, the updated device profile to an other communications device system, wherein each of the first communications device system and the other communications device system comprises a media processing system, wherein the media processing system comprises a software platform that provides at least the following: user interface functionality, distributed storage functionality, networking functionality, control over media peripheral devices in the private home, status monitoring of the media peripheral devices, and inter-home routing to other communications device systems;

receiving a file, pushed from the other communications device system in a non-broadcast channel, and the media content that has been adapted by the other communications device system that sent the file based upon the revised device profile, wherein the non-broadcast channels comprise non-broadcast channels originally constructed, originally sourced, and sent by the other communications device system and non-broadcast channels originally constructed and originally sourced by the first communications device system, wherein the adapted media content is set, by the other communications device system, to a first quality level that is lower than a second quality level, wherein the first quality level and the second quality level are supported by the first communications device system, wherein the file is associated with the media content and identifies a location where the media content of a highest quality is stored, wherein the location where the media content of the highest quality is stored is not the other communications device system that sent the adapted media content; and providing, by the first communications device system, a TV channel guide look-and-feel user interface to display non-broadcast channels and broadcast channels, wherein the non-broadcast channels displayed in the private home comprise the non-broadcast channel originally constructed by, originally sourced by, and received from the other communications device system and non-broadcast channels originally constructed and originally sourced by the first communications device system.

28. The method according to claim 27, wherein non-broadcast channels displayed by the other communications device comprise a non-broadcast channel originally constructed, originally sourced, and sent by the communications device and non-broadcast channels originally constructed and originally sourced by the other communications device.

29. The system according to claim 27, wherein the communications device communicates with a third party media server through the network, wherein the other communications device communicates with the third party media server through the network, and wherein the communications device uses its TV channel guide look-and-feel user interface to send a request from the communications device to the third party media server for the third party media server to anonymously send third party media content to the other communications device.

* * * * *